United States Patent [19]

Huang

[11] Patent Number: 4,847,776

[45] Date of Patent: Jul. 11, 1989

[54] MICROPROCESSOR PARKING METER INTERNALLY HELD IN A CAR

[76] Inventor: Chung-Hua Huang, P.O. Box 10160, Taipei, Taiwan

[21] Appl. No.: 183,908

[22] Filed: Apr. 20, 1988

[51] Int. Cl.⁴ .......................... G08G 1/14; G04F 3/00
[52] U.S. Cl. ............................... 364/467; 340/932.2; 368/90
[58] Field of Search ................. 364/409, 467; 340/51; 368/90; 235/378

[56] References Cited

U.S. PATENT DOCUMENTS

| | | | |
|---|---|---|---|
| 3,959,632 | 5/1976 | Trehn et al. | 340/51 |
| 4,310,890 | 1/1982 | Trehn et al. | 364/467 |
| 4,379,334 | 4/1983 | Feagins Jr. et al. | 364/467 |
| 4,460,965 | 7/1984 | Trehn et al. | 364/467 |
| 4,717,815 | 1/1988 | Tomer | 364/467 |

Primary Examiner—Jerry Smith
Assistant Examiner—Steven G. Kirby

[57] ABSTRACT

A microprocessor parking meter includes: a casing; a plurality of control keys formed on the casing for selecting several parking areas, for starting a timing operation or for stopping the timing operation; a display of multiple digits formed on the casing for showing a selected parking area, a number of parking units and a real clock time, a microprocessor operatively scanning the display and the control keys for showing or sequentially degrading the number of parking units each unit corresponding to a time interval with respect to a selected parking areas among the plural different parking areas during a lapse of parking time, forming a compact unit held in a car ready for outside inspection or for convenient parking service by a owner of the meter.

2 Claims, 3 Drawing Sheets

MICROPROCESSOR PARKING METER INTERNALLY HELD IN A CAR

BACKGROUND OF THE INVENTION:

A conventional parking meter installed at a street side may be operated by dropping coins therein for timing purpose, which however may have the following drawbacks:

1. The car driver must prepare enough coins for dropping into the parking meter by estimating the fees based on an estimated total parking period. Otherwise, the driver may pay an extra fine if an unexpected overdue parking is caused.

2. The parking meters are juxtaposedly installed by a street, thereby possibly obstructing pedestrians or influencing the esthetic appearance of a city. A management cost for collecting the coins from the meters or a high maintenance cost for maintaining the meters may be consumed.

3. If it is necessary to set up several standards of parking fees with respect to different parking areas or zones, for instance, area A being 15 minutes of duration per parking unit (in terms of a specific amount of money) or area B being 30 minutes per parking unit, there must be provided many categories of parking meters preset with different time intervals with respect to the different areas, thereby resulting in an increase of their installation cost and also an increase of the driver's inconvenience since the driver must calculate the parking fees from area to area.

The present inventor has found such drawbacks of a conventional parking meter and invented the present microprocessor parking meter held internally in a car to overcome the aforementioned drawbacks.

SUMMARY OF THE INVENTION:

The object of the present invention is to provide a microprocessor parking meter, which is held in a car so that an inspector may check the meter outside a car window, and is provided with a microprocessor operatively showing a number of parking units, each unit corresponding to a parking duration or time interval with respect to a selected parking area or zone, in that the parking units are sequentially degraded as the parking time progresses and the parking areas are optionally interchangeable for enhancing parking convenience.

Figure 1:
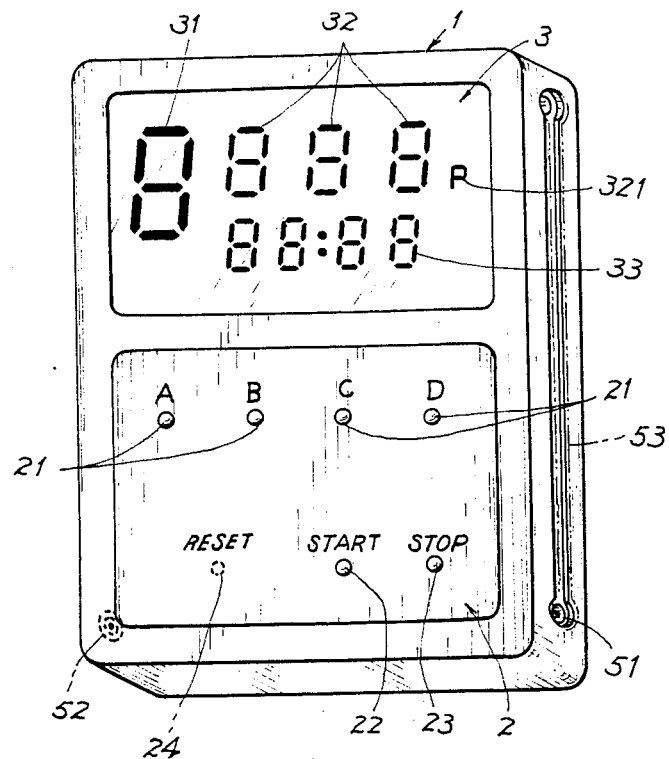
FIG. 1 is a perspective view of the present invention.

DETAILED DESCRIPTION:

As shown in the figures, the present invention comprises: a casing 1, a control key means 2, a digital display means 3, a microprocessor means 4 and a trigger means 5.

The control key means 2 is formed on a lower portion of the casing 1 and the display means 3 is formed on an upper portion of casing 1.

The control key means 2 includes: a plurality of area selector keys 21, such as : area A, B, C, and D for four different parking areas, a start key 22 for starting a timing operation of the present invention, a stop key 23 for stopping the timing operation of the present invention, and a reset key 24 built in an internal location in the casing 1.

The area selector keys 21, such as area A, B, C, and D, can be designated as: a time interval of 15 minutes for area A per parking unit which can be charged in terms of a specific amount of money; 30 minutes per parking unit for area B; 60 minutes per parking unit for area C; and 90 minutes per unit for area D as restricted, for instance, by a government agency. The reset key 24 can be reset for three times according to a governmental policy. For instance, if a total 200 parking units have been finished, the reset key 24 can be reset after opening a lead seal normally sealing the casing by a government authority for further recycling use of the present invention.

The display means 3 includes: a parking area display 31 which is a first digit operatively indicating the parking areas A, B, C, or D; a parking-unit display 32 with a second, third and fourth digit showing a number of parking units such as 200 units as restricted by a government agency; a parking-at-present display 321 with a decimal point P of the fourth digit beside the parking-unit display 32 indicating the meter being parking at the present time; and a time indicating display 33 with the fifth, sixth, seventh and eighth digit showing a real time of the present invention.

The microprocessor means 4 includes: a central processing unit 41 such as CPU 6802 for performing a routine work for scanning a display data and scanning control keys and also performing subroutine work for sequentially degrading or reducing the parking units each unit corresponding to a parking time interval with respect to a selected parking area among the different parking areas during a lapse of parking time and also performing an interrupt-routine for indicating a real time; a program memory device 42 such as EPROM 2732 for memorizing the aforesaid routine instructions; a chip selector 43 such as 74 LS 138 for selecting an input/output interface chip 44 such as I/O port 6821 when receiving a signal from the central processing unit 41 as fetching address data from the memory device 42, or for selecting an input interface buffer 47 such as 74 LS 245 when the central processing unit 41 scanning the contral keys; a display decoder 45 such as 74 LS 42 connected with a port of the input/output interface chip 44 for selecting a scanned display digit of the plural digits; a display buffer 46 such as 74 LS 245 connected with the other port of the interface chip 44 for scanning the seven segments (a, b, c, d, e, f, and g) and a decimal point of a fourth digit (DP now being shaped as "p" to indicate parking-at-present) of a display digit; the input interface buffer 47 operatively actuating the central processing unit for performing the routine instruction as fetched from the memory device 42 as previously written in when operated by a keyin input instruction by the control key; and a hardware time base 48 having a quartz crystal oscillator such as 4060 capable of producing clock pulses for indicating a real clock time. The time base 48 may exert a signal of eight oscillations per second to request an interrupt of the performance of the central processing unit 41 through the input/output port 44 so that the CPU 41 will jump to an interrupt routine for indicating a real clock time. After finishing the interrupt routine for time indication, the CPU will return to proceed its main routine work, such as the scanning of the display and control keys.

Figure 7:
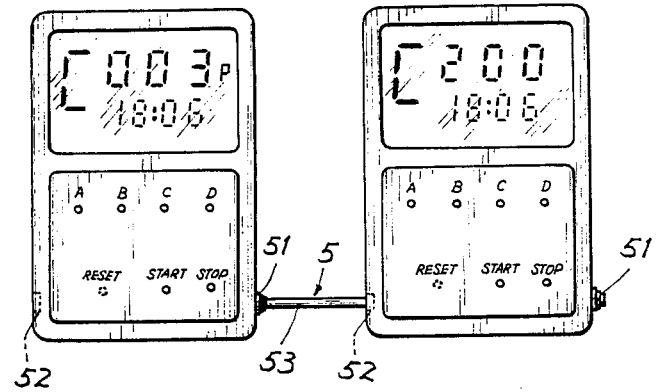
FIG. 7 is an illustration showing a connection of a "fresh" meter to a "finished" meter for triggering the "fresh" meter.

The trigger means 5 includes: a trigger-out connector 51 formed on a right side of the casing 1 and connected to an output pin 19 of chip 44 through a transistor 511, a trigger-in connector 52 formed on a left side of the casing 1 and connected to an input pin 12 of the buffer 47, and a connection cord 53 normally embedded in a side portion of the casing 1 as shown in dotted line of FIG. 1 for connecting a trigger-out connector 51 of a "used" meter to a trigger-in connector 52 of a "fresh" meter as shown in FIG. 7.

Figures 3, 4:
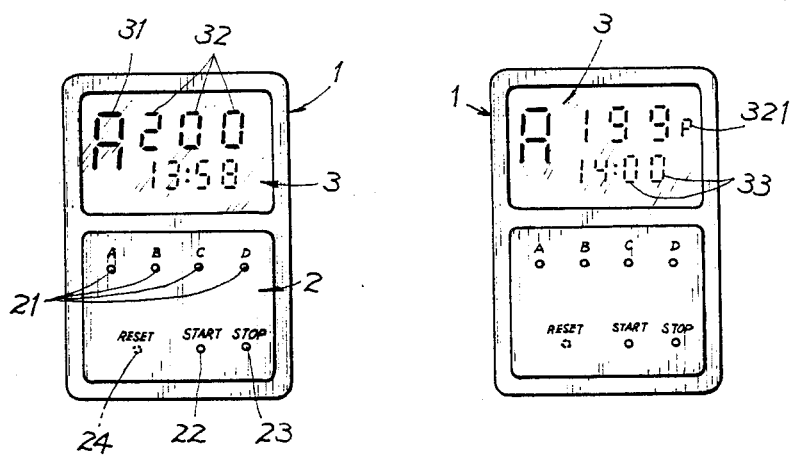
FIG. 3 shows an operation step for selecting a parking area in accordance with the present invention.
FIG. 4 shows a starting of the timing operation of the present invention.
Figure 2:
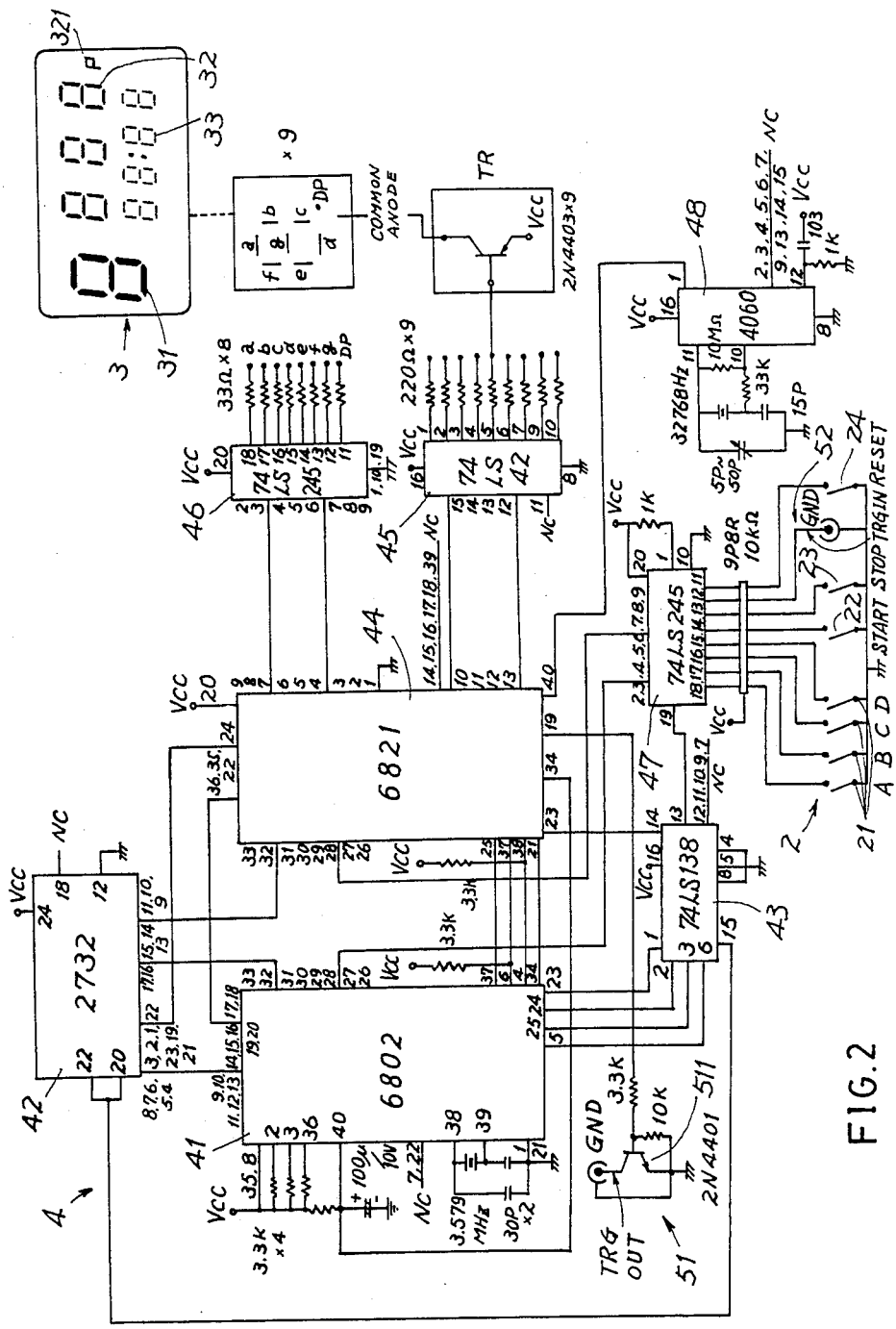
FIG. 2 is a circuit diagram of a microprocessor means of the present invention.

In using the present invention to serve for parking purpose, the user or car driver may depress the area selector key 21 such as key A for parking his or her car in area A. By the way, the display means 3 will display A in first digit 31 and display "200" in parking unit display 32 as shown in FIG. 3. It is not yet timing at this time so that a false depression for area selection may therefore be corrected.

Figure 5:
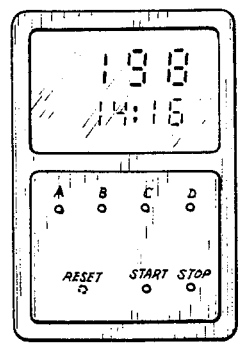
FIG. 5 shows a stopping of the timing operation of the present invention.

The start key 22 is then depressed to show on the parking unit display 32 a degraded number of "199" and also to show the letter "p" of parking-at-present display 321 as shown in FIG. 4. In 15 minutes, the display 32 of parking units may be reduced to "198" and at this time, the driver may depress the stop key 23 to stop the timing operation (the reduction of parking units on display 32) of the present invention if he or she wants to leave the parking place. The two displays 31, 321 will remain blank and the parking unit display 32 may still show the number "198" as shown in FIG. 5.

Figure 6:
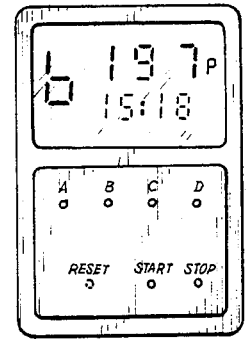
FIG. 6 shows a change of parking area in operating the present invention.

If the driver drives to area B, he or she may depress the selector key B as similar as aforementioned so that the parking units will be reduced to "198" as shown in FIG. 6 which will be subsequently reduced to "196" in 30 minutes.

An shown in FIG. 7, when a left meter merely indicates a residual number of parking units of "003", a new (right) meter can be connected to the old (left) meter by a cord 53 of the trigger means 5 so that a trigger signal may trigger the new meter to proceed the timing operation as aforesaid until the parking unit is present as "000" and the parking time lapses to the last second, for the continuous timing service.

Figure 8:
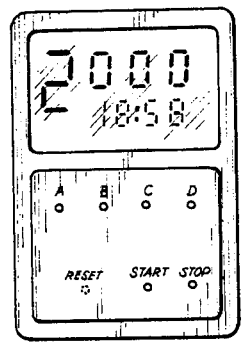
FIG. 8 shows a reset operation of the present invention.
Figure 9:
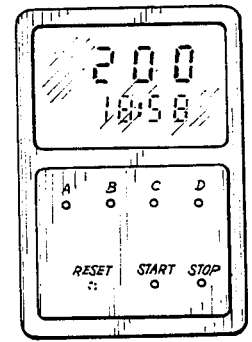
FIG. 9 shows a clock indicating a real time as effected by the present invention.

As shown in FIG. 8, after the parking units of 200 times have been finished, the meter may be returned to the government agency for resetting another cycle of timing operation of the present invention by actuating the reset key 24 as concealed in the casing 1. The reset number may be subsequently reduced from "3" to "2", and so on. Even when the present invention can no longer be reset for further recycling use, it may still serve as a clock for indicating a real time as shown in FIG. 9.

In selecting a parking area as mentioned in the foregoing procedures, such as: depression of selector key A, a key-in signal is detected by the interface chip 47 to actuate the CPU 41 to jump to perform a subroutine work for depressing key A as prewritten in the memory device 42 to show "A" in parking area display 31, and the CPU will then return to perform its main routine work. After depressing the start key 22 to be detected by the interface chip 47, the CPU will jump to a subroutine for depressing key 22 to sequentially reduce an unit from the total (residual) parking units as shown in display 32 and also to set a timing-comparison flag based on a specific time interval with respect to the selected parking area (e.g., 15 minutes for area A). After finishing the subroutine timing work, CPU will return to perform its main routine work. The performance of the other subroutines, such as for area B, C, or D, may be referred to the aforesaid steps.

The present invention has the following advantages superior to a conventional parking meter:

1. Several different parking areas or zones may be optionally elected without requiring a careful estimation for calculating the number of coins to be dropped into a conventional coin-operated parking meter. Those different parking areas can be conveniently interchangeable.

2. The parking timing is effected and indicated by a number of parking units each corresponding to a time interval with respect to a selected parking area among the plural different parking areas so that the user will not worry about the estimation for parking time or parking fees as well as the frequent changes of parking areas.

3. The present meter may be made as a compact unit to be held behind a car window ready for inspection by a governmental official or cleck, for saving a large installation maintenance and management cost as required for equipping or erecting so many conventional parking meters at a street side.

I claim:

1. A microprocessor parking meter as internally held in a car comprising:

a casing:

a control key means formed on a lower portion of said casing having a plurality of area selector keys for selecting plural different parking areas, a start key for starting a timing operation of said microprocessor parking meter, and a stop key for stopping the time operation of the parking meter;

a display means formed on an upper portion of said casing having a plurality of digits indicating a parking status and real time which includes a first digit for parking area display, a second, third and fourth digit for a parking-unit display, a decimal-point of the fourth digit for showing parking-at-present, and a time indicating display with the fifth, sixth, seventh and eighth digit showing a real clock time;

a microprocessor means operatively manipulating said display means as actuated by said control key means for showing and sequentially degrading or reducing preset parking units each unit corresponding to a parking time interval with respect to a selected parking area among the different parking areas during a lapse of parking time; and a trigger means having a trigger-out connector and a trigger-in connector respectively formed on two opposite sides of said casing and electrically connected with said microprocessor means, having a connection cord operatively connecting a trigger-out connector of a first parking meter to a trigger-in connector of a second parking meter for continuously actuating the second meter when the first meter is finished.

2. A parking meter according to claim 1, wherein said microprocessor means includes: a central processing unit operatively scanning said display means and said control key means for sequentially degrading the parking units each unit for corresponding to a parking time interval, a program memory device for memorizing a plurality of instructions therein to be fetched by said central processing unit, a chip selector electrically connected with said central processing unit and operatively selecting an input/output interface chip or for selecting an input interface buffer, a display decoder connected with a port of said input/output interface chip connected to said central processing unit for selecting a scanned display digit of the digital display means, a display buffer connected with the other port of said input/output interface chip for scanning of a display digit, the input interface buffer operatively actuating said central processing unit for fetching instructions from said memory device as operated by said control key means, and a hardware time base having a quartz crystal oscillator capable of producing clock pulses for indicating a real clock time on said display means.

* * * * *